United States Patent [19]
Meyer

[11] Patent Number: 5,463,698
[45] Date of Patent: Oct. 31, 1995

[54] METHOD FOR THE PROCESSING OF IMAGES BY HIERARCHICALLY ORGANIZED QUEUES

[75] Inventor: Fernand Meyer, Veneux les Sablons, France

[73] Assignee: Association pour la Recherche et le Development des Methodes et Processus Industriels (Armines), Paris, France

[21] Appl. No.: 119,126

[22] PCT Filed: Mar. 19, 1992

[86] PCT No.: PCT/FR92/00247

§ 371 Date: Dec. 29, 1993

§ 102(e) Date: Dec. 29, 1993

[87] PCT Pub. No.: WO92/16908

PCT Pub. Date: Jan. 10, 1992

[30] Foreign Application Priority Data

Mar. 20, 1991 [FR] France .................................. 91 03384

[51] Int. Cl.[6] .................................................. G06K 9/62
[52] U.S. Cl. .......................................... 382/276; 382/302
[58] Field of Search .................................. 382/41, 49, 37, 382/34

[56] References Cited

U.S. PATENT DOCUMENTS

| 4,809,348 | 2/1989 | Meyer et al. | 382/49 |
| 5,274,717 | 12/1993 | Miura et al. | 382/41 |

*Primary Examiner*—Leo H. Boudreau
*Assistant Examiner*—Phuoc Tran
*Attorney, Agent, or Firm*—Kerkam, Stowell, Kondracki & Clarke; Edward J. Kondracki

[57] ABSTRACT

A method for processing images using hierarchically organized queues is provided. In particular, the method relates to the segmentation and filtering of certain shapes whose contours appear to be imprecise due to the existence of image noise, thereby eliminating such noise and providing a more precise image. The disclosed method is applicable to all sectors of image analysis and is especially useful in the analysis of images acquired by tomographs used in the medical field, whether these images are two-, three- or even four-dimensional. The method can also be extended to numerous dimensions and to color images. The method is also of particular usefulness in the fields of traffic control, i.e., detection of vehicles and roads, and more generally to all fields of industrial vision. The disclosed method can also be essential in coding and image compression for telecommunications and archiving.

21 Claims, 5 Drawing Sheets

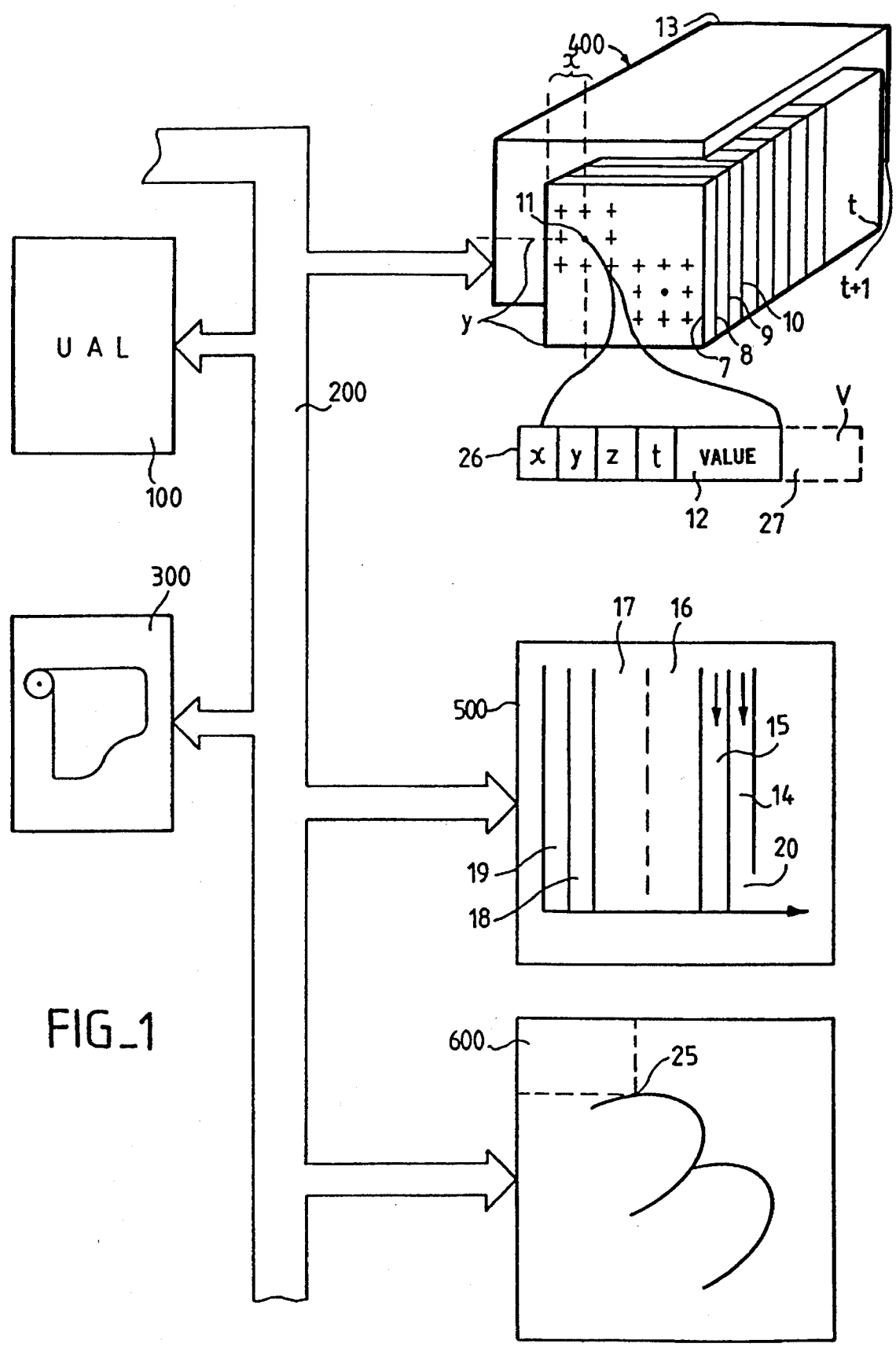
FIG_1

FIG_2-a
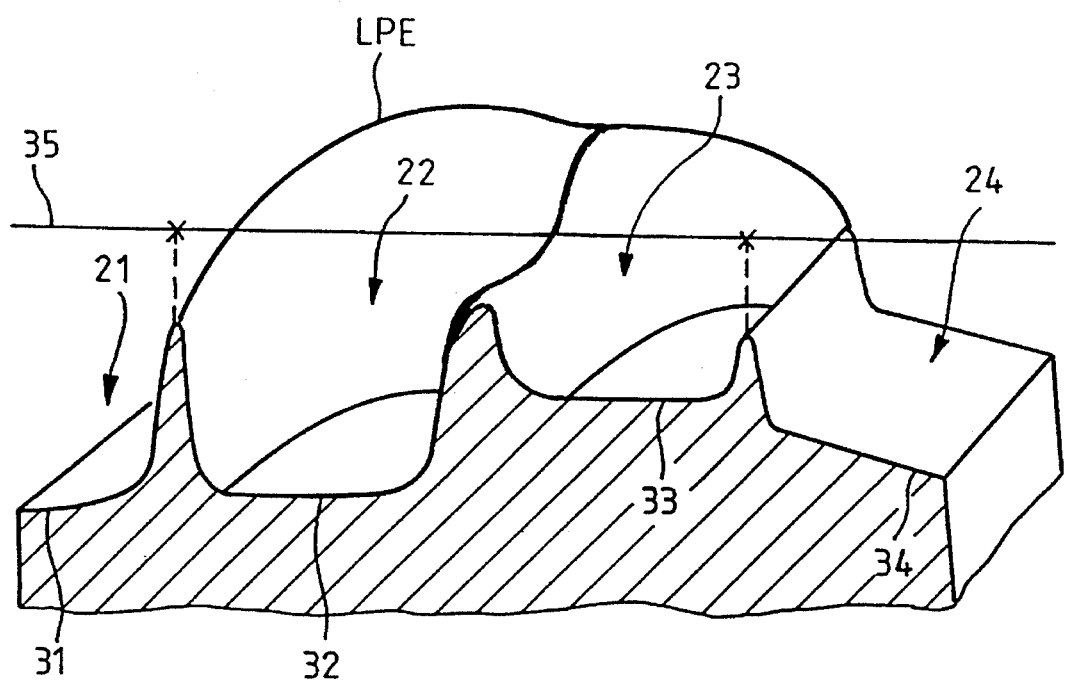
FIG_2-b
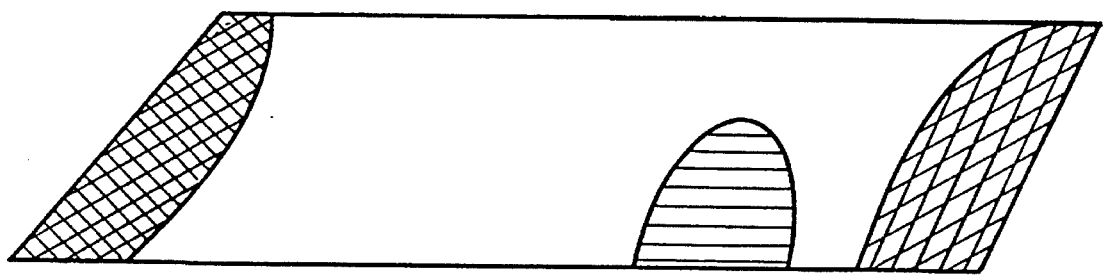

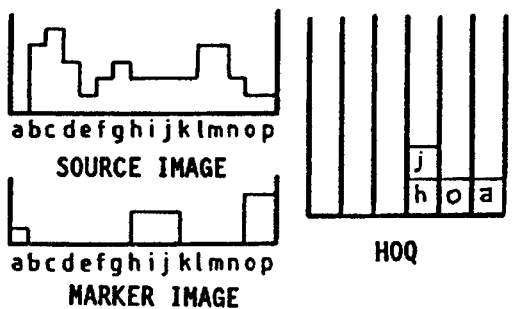
FIG_3a
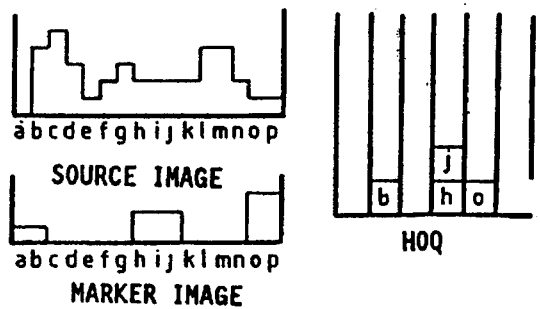
FIG_3b
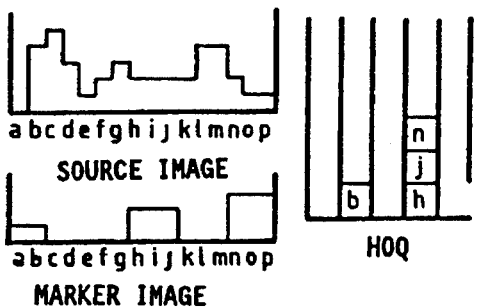
FIG_3c
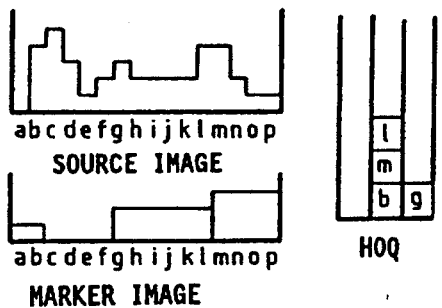
FIG_3d
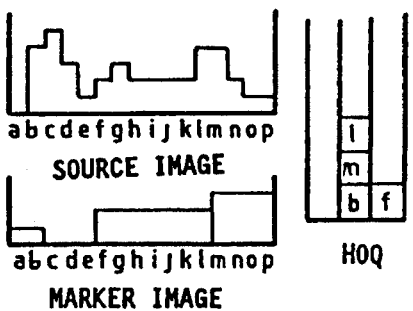
FIG_3e
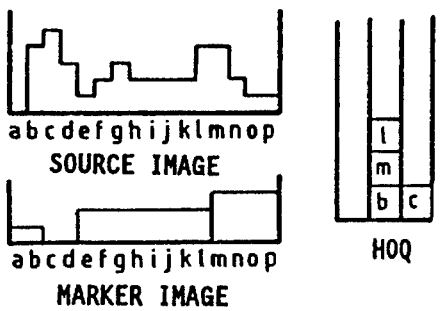
FIG_3f
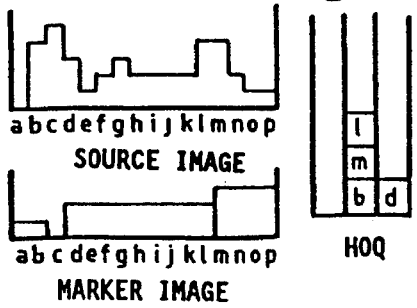
FIG_3g
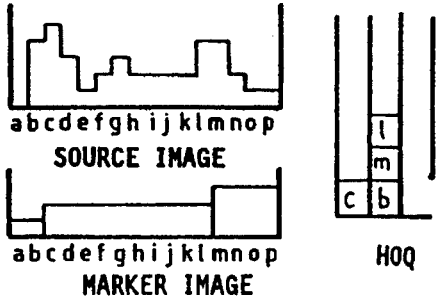
FIG_3h

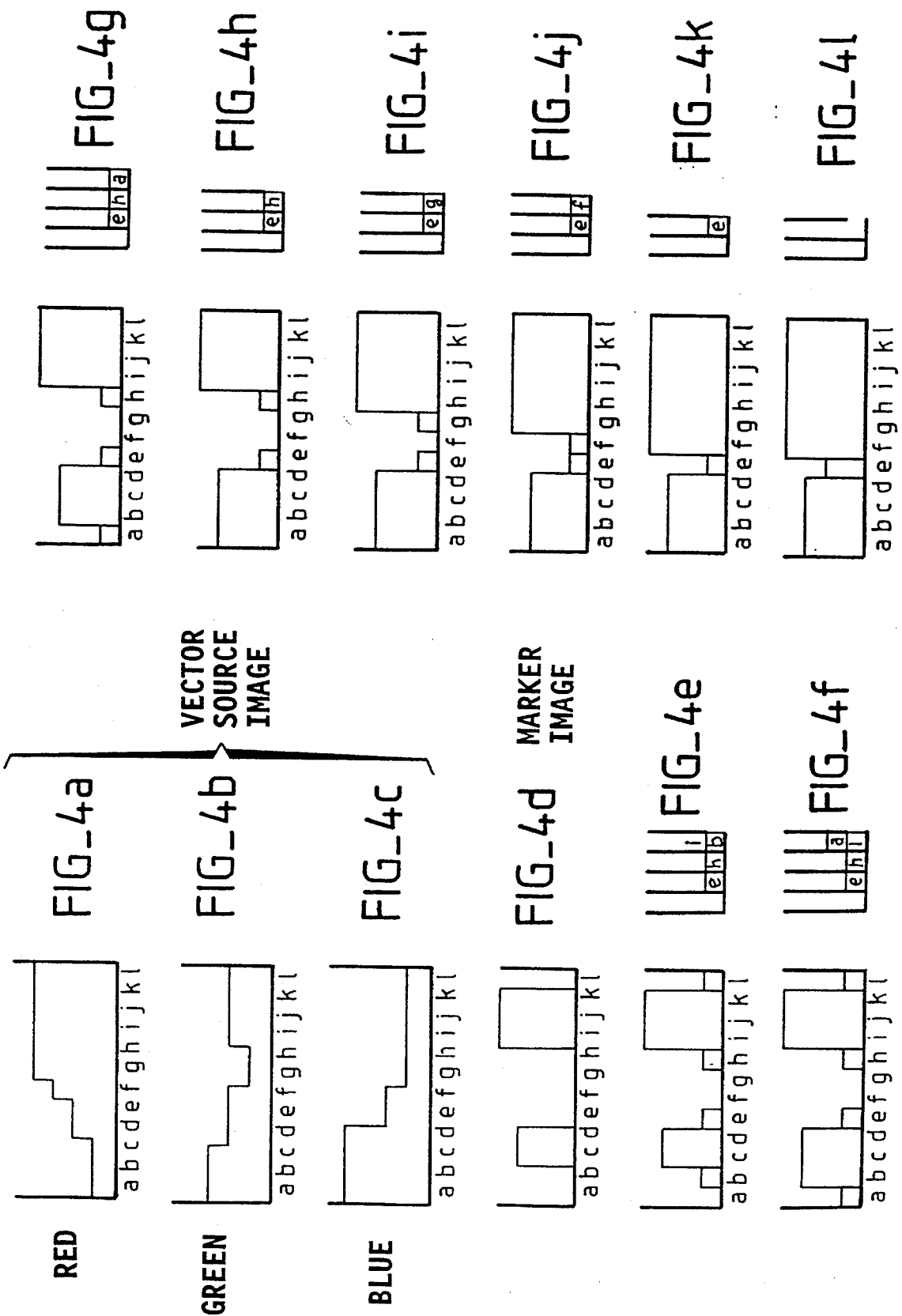

FIG_5a
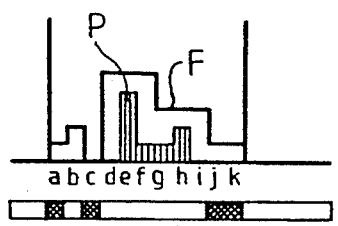
REGIONAL MINIMA
FIG_5b
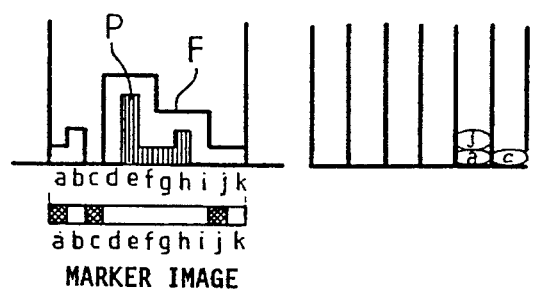
MARKER IMAGE
FIG_5c
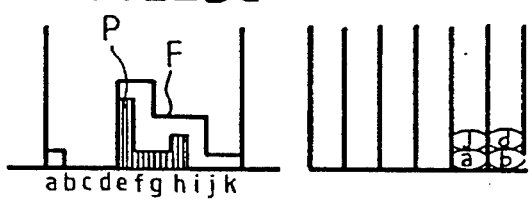
MARKER IMAGE
FIG_5d
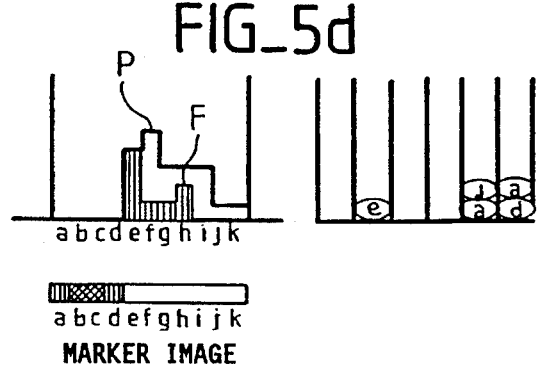
MARKER IMAGE
FIG_5e
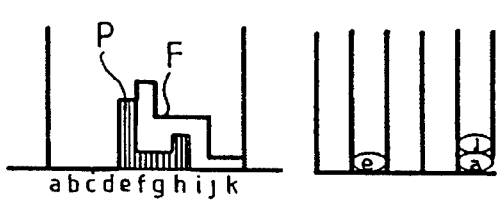
MARKER IMAGE
FIG_5f
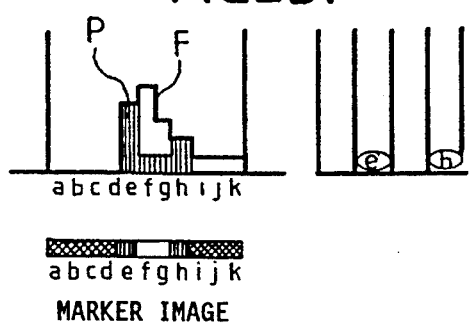
MARKER IMAGE
FIG_5g
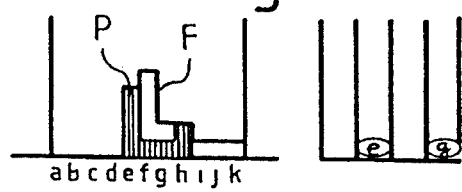
MARKER IMAGE
FIG_5h
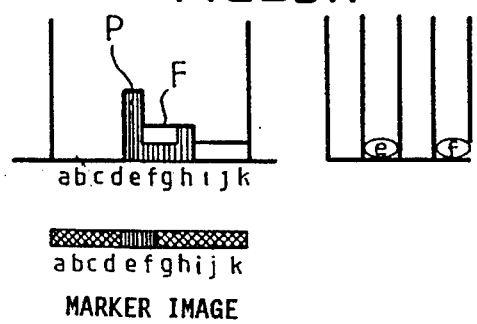
MARKER IMAGE

METHOD FOR THE PROCESSING OF IMAGES BY HIERARCHICALLY ORGANIZED QUEUES

The object of the present invention is a method for the processing of images with the use of hierarchically organized queues. It relates more particularly to the segmentation of the images, namely to the recognition, in an image, of certain shapes whose contours, notably because of the image noise, appear to be imprecise, and to the filtering, namely the elimination of noise. It can be used in all sectors of the analysis of images, especially in the medical field, in the analysis of the images acquired by tomographs, whether these images are 2D images or 3D images or even incorporate time as a fourth dimension. The method can furthermore be extended to numerous dimensions as well as to color images. The method of the invention can also be applied in the field of traffic control, for the detection of vehicles and of roads, and more generally in all fields of industrial vision. Finally, it can constitute an essential part in coding and image compression operations for telecommunications and archiving.

The main two problems to be resolved in image processing are the simplification of images in order to extract their major features and to eliminate the noise from them, as well as the extraction of relevant contours of the objects that are to be subjected to measurements. Standard solutions to these problems exist, and are based on the techniques of mathematical morphology, described for example in the work by J. Serra, *Image Analysis and Mathematical Morphology*, vols. 1 (1982) and 2 (1988), Academic Press. The images are subjected to neighborhood transformations, such as erosion and expansion.

It may be recalled that processing with such operators amounts to qualifying a value of an image parameter at each picture element as a function of values of image parameters which are, in principle, the same, at picture elements neighboring this picture element. Thus, for a television type 2D image, an exploration is carried out, with a window of analysis, of all the picture elements of a line and all the lines one after the other, and a picture element located at the center of the window is assigned an image parameter, for example a luminosity, computed according to a mathematical function, for example the minimum value encountered in the window, of the other picture elements contained in the window. Normally, these transformations are undertaken iteratively. At each iteration, there is the creation of a new image increasingly approaching the final image desired. The algorithm is stopped when then new iteration no longer changes anything in the result of the transformation.

The main drawback of these transformations is their slowness, when they are carried out on a conventional computer. To overcome this drawback, a wired device has been described in the French patent filed on Jul. 11 1975 under number 75 21925. When there is no such wired device, the processing can be accelerated by resorting to sequential transformations of images. For example, a method and a device for the sequential transformation of images are known from the French patent No. 2 586 120 filed on Aug. 7, 1985 under No. 85 12120. The object of the sequential improvement is the incorporation, in the window of exploration, of picture elements belonging to the image to be processed and picture elements that have just been processed just before the picture element on which the window is now centered. This sequential technique enables a reduction in the number of iterations but, for reasons of coherence, needs to be carried out at least a second time, with the image being explored in the reverse direction to the first direction of exploration.

In view of the number of picture elements to be processed, in particular when the resolution is of the order of 1024 picture elements by 1024 picture elements, or else for 3D images or again for successions of images to be coded and transmitted swiftly in telecommunications, a processing algorithm such as this is still far too long. It will be shown that, with the invention, it is possible to obtain a gain in processing speed of the order of at least two, and most usually far more, for equal machine power. Essentially, in these sequential type of processing operations, all the picture elements are read and processed at least twice during the processing whereas it will be shown that, with the invention, the picture elements are read only once.

Furthermore, there is a method of processing with queues, known from an article by J. H. Werwer et al in the journal *IEEE Transactions on Pattern Analysis and Machine Intelligence*, Vol. 2, No. 4, pp. 425 ff., Apr. 4, 1989. The elements to be processed are stored in queues or buckets, each having a level of priority. The first image element to be processed is the one that is found first in the bucket having the highest priority. This processing method concerns binary images and considers all the picture elements that are in a given neighborhood of the current picture element; these elements are arranged in buckets corresponding to their level of priority determined according to their distance from the central element. Furthermore, according to this document (page 426), column 1, line 10, the order of processing of the elements inside a bucket is of no importance.

In the invention, on the contrary, it is possible to process images with grey levels and not simply binary images. For a given picture element, its neighbors are considered. These picture elements are arranged in queues, not as a function of their distance from the central picture element but as a function of the distribution of the grey levels in their neighborhood. The grey level represents the value of an image parameter in terms of luminosity. The number of queues is determined by the distribution of the values of the image parameters and not by the geometry of the digitization grid of the image. And, for each queue, the picture elements must be processed in their order of arrival and not in any order whatsoever.

Indeed, the essential object of the invention is to dictate an order of processing between the picture elements, enabling a picture element to be processed at the precise time when it assumes it definitive value. To obtain the same result, for example a watershed line, the other methods make each picture element take several successive values in the course of processing before they are given a definitive value. The hierarchically organized queue of the invention has several advantages: it introduces this order of processing naturally, especially on plateaux of constant altitude of the image, and it is less demanding in terms of the volume of the working memory to be implemented.

Since the object of the invention is a method for the processing of an image, it is necessary to define the meaning of the term image: an image is defined in an image memory of a computer system as a collection of picture elements, pixels, voxels, nodes of a graph etc. each of which is assigned at least one value of a parameter of this image, an address representing the place of this picture element in this image and the list of all its neighbors. The parameter represents a physical magnitude of a body, the address corresponds to a place in the body, the list of the neighbors being always similar to itself when the picture elements are positioned on a regular grid, but being incapable of being so when they are nodes of a graph, pieces of a puzzle or of geographical regions. To know the neighbors of a picture element, various procedures can be used. In a standard way, the neighbors of a picture element in the image are picture elements for which at least one of the terms of the address is different from a unit of the term corresponding to the address of this picture element, or even more generally a predetermined number of units, greater than or equal to two (depending on the size of the neighborhood to be considered). In another way, if the notion of address is not a simple one, for example when States on a map of the world are considered, it is possible to determine the neighborhood of each picture element, namely each State, in advance by associating, with each picture element, a list of its neighbors. For example, France's neighbors are Spain, Italy, Switzerland, Germany, Luxembourg and Belgium. In the same example, the British Isles would have no neighbors. Rather than determining this neighborhood list in advance, it is also possible to determine it on seeing the image itself, in a preliminary phase. Thus, for a population of cells on a histology plate, it is possible to identify the center of a first cell and that of a second cell. It is possible to plot a circle which has these two centers as ends of the diameter. And then it can be ascertained that no other cell is in this circle. If this is the case, then it is said that the second cell neighbors the first one and vice versa, it is added to the list and another second cell is studied. If this is not the case, another second cell is studied. The images, where the parameter represents a physical magnitude of a body, will hereinafter be called physical images.

Use will also be made of particular images, called marker images, where the image parameter does not represent a physical magnitude of a body but uses labels to designate classes of membership of certain picture elements in a particular region of interest. The determining of the markers can be done in several ways. For example, an operator looks at an unprocessed image, corresponding to the direct display of the image values on a screen. This image is noise-ridden. In this image, he nevertheless distinguishes large surface masses because these masses have either the same luminosity or a same contrast or, on the contrary, a same variation of luminosity, or any other character of coherence. It is therefore possible for this operator, by using a trackball, mouse or even an optical pencil to point out picture elements, on this screen, that are located in the middle of these large surface masses and thus assign them, in a marker image memory, a particular qualifier representing its class of membership. A surgeon can thus point out the different cancerous metastases visible in a scanner section of the brain before the machine automatically extracts the contours from this tumour. Rather than being done by an operator, the observation of the image can be done automatically and may be the result of a prior processing of the image. The elements considered as markers may be, for example, the regional minima of the image, namely all the plateaux of the image having a constant altitude, all the neighbors of which have higher altitudes. It is also possible to cite the case of the images of moving scenes, where it often happens that the results of the segmentation carried out on the image corresponding to an instant t gives the markers for the processing at an instant t+1. Other methods of automatic marking can also be envisaged. They are also known (see for example, an article by F. Meyer et al, "Morphological Segmentation", *Journal of Visual Communication and Image Representation*, Vol. 1, No. 1, September 1990, pp. 21–46).

It is clear that the mode of representation of the marker image is hardly important. In the memory of a data-processing system, it may be an image separate from the physical image, or else a sequence of additional bits added to the end of the memory words representing each element of the physical image.

An object of the invention is a method for the processing of a pair of images constituted by a physical image and a marker image. The result of the processing will be a new image, called the result image. At each point x of the physical body, several scalar or vector parameters are thus defined: these are a physical parameter, a marker parameter and a result parameter. All the values assumed by these parameters at a point x constitute a vector called an image vector at the point x.

The image vector at a point x is modified when one of its components at least is modified. Furthermore, the term, image window at the point x, will be applied to all the vectors of images of the point x and of its neighbors in a determined neighborhood. The image window at a point is modified when one of the vectors of an picture element constituting it is modified.

An object of the invention therefore is a method for the processing of an image comprising the preparation of a pair of images, this pair comprising a physical image and a marker image, an initialization phase and a processing phase, and being aimed at the construction of a result image during which, in the initialization phase:

a hierarchically organized group of queues or HOQ is created, the queues of this group being of the first-in-first-out type and being differentiated from one another by their correspondence with one value among the possible values of a priority parameter (it being possible for this parameter to be the physical parameter itself, or a parameter derived from it, such as the distance of the colors between two colored elements), this group comprising a queue placed at the top of the hierarchy, having priority, as a function of these values, above the one that is placed just after it in the hierarchy, and so on until the one placed at the bottom of the hierarchy;

in the physical image and/or marker image, picture elements for initiating the method are identified (they may be, as the case may be, markers possessing, in their neighborhood, a picture element that does not belong to a marker, or else picture elements outside the markers having a picture element of a marker in their neighborhood), a level of priority of each initiating picture element is assessed as a function of the values of an image window, the addresses of the initiating picture elements are stored in a queue, this queue pertaining to the value of their priority parameter (or else to a conventional value of initialization), in the processing phase, the steps 1 and 2 are repeated so long as the hierarchical queue is not empty:

step 1: the address of the picture element having the highest priority is extracted from the queue with the highest priority that is undergoing processing, x designating this picture element, step 2: for each neighbor y of x, that is identified by a list of the neighborhood of x and that has never yet been stored in the HOQ during the processing phase, the level of priority of y is assessed as a function of the image window of x, the address of y is stored with this level of priority in the HOQ, and a new image window of x is computed as a function of the old one.

The exploitation of the image thus processed may then take any form: display, statistical measurement or triggering of an alarm or an action for example. The order of the operations of the second step is not necessarily the one appearing in the list of the operations of this step. When it is said that a new window of x is computed, it is understood that any one of the parameters of x is modified: its physical, marker or result parameters or else again the parameter or parameters of at least one of its neighbors. It will be noted that the invention enables the production of the result image without any returning backwards: the computation of the result parameter at a picture element is done only when the image window of this picture element enables it. Indeed, during the processing phase, all that are processed are the picture elements that have been stored in the HOQ, and the step 2 guarantees that a picture element which has been placed previously in the HOQ during the processing phase is never put therein again. By contrast, it is not ruled out that that the processing phase entails the putting back, into the HOQ, of a picture element that has already been placed during the processing phase but with a different priority. The core of the invention is constituted by the use of hierarchical queues which, at any time, store the addresses of the boundary picture elements of the image for which the result is already known and which present each picture element for the processing when the state of its image window makes this processing possible.

The invention will be understood more clearly from the following description and from the figures that accompany it. These figures are given purely by way of an indication and in no way restrict the scope of the invention. The figures show:

FIG. 1: a schematic view of a data-processing system that can be used to implement the method of the invention;

FIG. 2a: a view in perspective of a watershed line in an application of hydrology;

FIG. 2b: the marker image corresponding to FIG. 2a;

FIGS. 3a to 3h: an exemplary implementation of the invention in the construction of the watershed line for a simple one-dimensional image;

FIGS. 4a to 4l: an exemplary implementation of the invention in the construction of a watershed line;

FIGS. 5a to 5h: an exemplary implementation of the invention, in the determination of the surface of a wrapping of a simple one-dimensional image.

FIG. 1 shows a system that can be used for the implementation of the image-processing method according to the invention. This data-processing type of system comprises a processor 100 or arithmetic and logic unit connected by an address and data bus 200 firstly to a program memory 300 containing the instructions of a computer program representing the method of the invention and, secondly, to an image memory 400, an auxiliary memory 500—5' and finally to a result memory 600 or display memory. The memory 600 may be used to show the processed image on a television monitor (not shown). The differentiated representation of the program, image, auxiliary and result or display memories is indicated herein solely to enable a better understanding of the invention. In practice, when the processing is carried out, the necessary information elements are loaded into a working memory of the system as and when needed.

The image memory 400 is symbolically represented in the form of pages such as 7 to 10 showing that the picture elements such as 11, the addresses of which are x and y, of the program, image, auxiliary and result or display memories is indicated herein solely to enable a better understanding of the invention. In practice, when the processing is carried out, the necessary information elements are loaded into a working memory of the system as and when needed.

The image memory 400 is symbolically represented in the form of pages such as 7 to 10 showing that the picture elements such as 11, the addresses of which are x and y, may have another address z enabling the definition of a physical body with three dimensions. The image stored in the memory 400 is supposed to represent the body in question. To each picture element with an address x, y, z in the memory, representing a location (which will be assumed, in the rest of this explanation, to have coordinates X, Y, Z related to x, y, z), there is assigned a value 12 representing a physical magnitude of the body. It is said that the image of this magnitude is made. Often, this physical magnitude is a measured magnitude. To take account of the development, in time, of the image, the information elements pertaining, at an instant t+1, to the same picture elements as those at an instant t, have been shown in an offset volume 13. In this case, each picture element is furthermore assigned a fourth address term t representing time. Hereinafter in the explanation, it shall be assumed that the invention can be extended to several dimensions, notably when the value 12 represented is synonymous with several physical magnitudes independently or in combination: the value 12 is the parameter of the physical image. In the memory 400, there is also stored the marker image having the same spatial and temporal extension as the physical image or a spatial and temporal extension different from that of the physical image, but where certain picture elements have a particular value indicating their class of membership.

In the invention, a hierarchically organized group of queues such as 14 to 19 is created in the auxiliary memory 500. The are of the first in first out type. This means that if, in the memory 500, for example in the queue 14, a series of addresses of picture elements are placed one after the other, the first picture element to be processed will, in this series, be the first one that has been introduced. There are known ways of using software or hardware automatons to manage queues such as these, the principle of which differs from that of the stacks. To this end, the queue 14 comprises, at its base, symbolically, an aperture 20 through which the address with the highest priority is picked up. The queues are filled by the top. These queues are referenced in a rising order of priority from left to right in FIG. 1. This means that all the picture elements whose addresses are stored in the queue 14 must be processed before those placed in the queue 15 and, continuing in this way, those of the queue 18 before those of the last queue 19. The queue 14 is the one placed at the top of the hierarchy. The queue 19 is the one placed at the base. These queues are thus said to be hierarchically organized and, hereinafter, all the queues shall be called HOQ for hierarchically organized queues.

FIG. 2a gives a view, in an example that shall be examined further below, of the use of the invention in order to determine, on a digital model of a terrain, that line which is the watershed line LPE between catchment basins 21 to 24. The search for a watershed line such as this is useful, for example, in map-making for the determining of the catchment basins associated with each stream. FIG. 2a is a physical image where the picture elements have 2D addresses (x, y) and where the image parameter is, for example, the altitude at these picture elements (z). In this case, the altitude is not the term of the address but the value of the image parameter. FIG. 2b shows the marker image, where each picture element has a marker label designating the class to which it belongs. Certain picture elements, directly in the basins 21 to 24, already possess a marker label identified by streaks in the drawing, while the others do not have them as yet (or else the value of their marker is zero).

The construction of the watershed line may be seen as a process of flooding during which each picture element of the marker image having a label becomes the source of a flood. All the picture elements flooded from a source picture element will bear the label of this source picture element and will belong to the catchment basin associated with this label. The sources are adjusted in such a way that, at any time, the height of the flood has a uniform altitude.

When the entire relief has been flooded, each picture element of the marker image bears the label of the source from which it has been flooded. In order to simplify the explanation, it shall be limited, especially with reference to FIGS. 3a to 3h, to what happens right on a line 35 of the image of FIG. 2a. In other words, the explanation will be limited to exploring the picture elements having a same ordinate value y. This in no way constitutes a restriction. With one to two or three dimensions, or even four dimensions when the time factor is incorporated, the construction of the watershed line is done in exactly the same way. All that has to be done is to choose the neighborhood structure suited to the number of dimensions. FIGS. 3a to 3h gives a view, at abscissa points a to p (hence addresses), of the picture elements located right on the line 35. On the ordinates axis, on the graph located at the top left-hand side of FIGS. 3a to 3h, the value of the physical image has been shown at each of the points. On the graph at the bottom left-hand side of FIGS. 3a to 3h, the value of the label of the marker image is shown. FIG. 3a shows the initial physical and marker images. In the present case, the marker image has three markers:

the first marker has the label value 1 and comprises the picture element a;

the second marker has the label value 2 and comprises the picture elements h, i and j, but not the picture element k, the third marker has the label value 3 and comprises the picture elements o and p.

We shall now see how the method of the invention can be specifically adapted to the construction of one of the variants of the watershed line. The way to adapt it specifically to another variant will easily be deduced therefrom.

In the initialization phase:

a hierarchically organized group of queues is created. The number of queues, herein six queues by way of simplification, is equal to the possible values 12 of the physical parameter at each picture element. In the present case, this image parameter may have a value of 0 to 5. Under certain conditions, it is possible to reduce this number of queues, especially if certain values have not been represented. The right-hand side of FIGS. 3a to 3h shows the state of the working memory 500 and the filling of the queues. The initiating picture elements of the method are identified in the image. In the present case, by convention related to this example, these are the picture elements of the markers possessing, in their neighborhood, a picture element that does not belong to a marker, i.e. the picture elements a, h, j and o. This is why neither the picture element i nor the picture element p are considered to be initiators.

the initiating picture elements are stored in a queue, and this queue relates to the value of their physical parameter. Thus the picture element a is stored with a queue to the right corresponding to a value 0, the picture elements h and j in a queue corresponding to a value 2 and the picture element o in a queue corresponding to a value 1. The resulting HOQ is shown in the right-hand part of FIG. 3a.

In the processing phase, the steps 1 and 2 will be repeated so long as the HOQ is not empty:

step 1: the address of the picture element having the highest priority is extracted from the queue with the highest priority that is undergoing processing; let x be this picture element, step 2: each neighbor y of x belonging to the neighborhood list of x, and having no label (or having a label with a value of zero) in the marker image is stored in the HOQ with a priority corresponding to its image parameter in the physical image. When it is stored in the HOQ it receives, in the marker image, a label identical to that of x. For reasons of economy of memory, it is thus possible for the marker image to be the same as the result image. In this way, the contents of the marker image at the end of the processing represent the result image.

FIGS. 3b to 3h show how the processing is done. The picture element a is the first picture element to come out of the HOQ. It has an image parameter equal to 0 and a marker label equal to 1. In the present case where, for purposes of simplification, the explanation has been limited to examining what happens on the line 35, the neighbors of a to be considered are only those that are located on either side on the line 35. Its only neighbor on the line 35 is the picture element b. The picture element b does not yet have any label in the marker image. It has therefore not yet been stored in the HOQ. The picture element b is stored in the queue corresponding to its image parameter, namely 4. The picture element b also receives the label of the picture element a, namely the value 1 in the marker image. The result of the processing of the picture element a is illustrated in FIG. 3b. The processing of the picture element a has not caused any picture element to enter the queue with priority 0. Since this queue is empty (FIG. 3b), it is eliminated and the queue having priority 1 becomes the queue with the highest priority.

The picture element o is the next picture element to come out of the HOQ. In coming out of the HOQ, it makes its right-hand side and left-hand side neighbors enter therein. Its left-hand side neighbor, the picture element n, does not yet have a label. It is stored in the queue corresponding to its image parameter, namely 2. It receives the label of o, namely the image 3 in the marker image. The right-hand side neighbor of the picture element o is the picture element p. It already has a label and is therefore not processed earlier. The result of the processing of the picture element o is illustrated in FIG. 3c. At the end of the processing of o, the queue having priority 1 is empty and is eliminated.

The processing of the queue having priority 2 then takes place as follows:

the picture element h, at the time of its extraction, makes its neighbor g enter the queue 3 and gives it the label 2, i.e. its own label.

the picture element j makes its neighbor k enter the queue 2 and gives it the label 2;

the picture element n makes its neighbor m enter the queue 4 and gives it the label 3;

the picture element k makes its neighbor 1 enter the queue 4 and gives it the label 2.

The queue with priority 2 is now empty. It is eliminated. The marker image and the HOQ are illustrated in FIG. 3d. The processing of g begins. Its only neighbor without a label is the picture element f. Now f has an image parameter equal to 2. It is therefore necessary to store it in the queue with priority 2. Now, this queue has been eliminated. All that is done then is to store f in the queue with the highest priority that is in the course of being processed, namely the queue with priority 3 (see FIG. 3e) and to give f the label 2. It is also possible, in one variant, to reserve a special queue to process these emergency situations which might have a higher priority than all the other queues still existing at a given time of the processing. Similarly, the processing of f makes the picture element e enter the queue 3 with the label 2, although the image parameter of e is 1 (FIG. 3f). FIG. 3g shows how the picture element e makes the picture element d enter the HOQ and gives it the label 2. The picture element c is then the only picture element without a label. The processing of d makes it enter the HOQ and gives it the label 2. The queue with priority 3, which is empty, is now eliminated (FIG. 3h). The next picture elements to come out of the HOQ are, in succession, the picture elements b, m, l and c. None of these picture elements now has any neighbor without a label. Their processing therefore does not make any new picture elements enter the HOQ. Thus when the last picture element, namely c, emerges from the queue, this file is empty and the processing stops. At this time, all the picture elements are provided with a label that is used to exploit the image.

There are many variants of the watershed line algorithm that can all be carried out according to the method of the invention which enables the simulation of the right order of flooding by means of the use of hierarchical queues. In one of them, "a dyke is built" at every picture element where floods coming from two different sources meet. We shall illustrate this by applying it to vector physical images. A major but non-restrictive example of such vector physical images is constituted by color images. A color image has a luminosity level in each of the basic colors. In standard television mode, these colors are red, green and blue. Or again, more appropriately, the R, G, B (red, green, blue) components can be converted into so-called H, L, S components respectively representing hue, luminance and saturation. There is a known way of making a combination of these three colors R, G, B or H, L, S or any other vector representation of color, such as those defined by the International Commission on Illumination (ICI) to compute a distance between the colored values of two picture elements. It is possible, for example, to choose a Euclidean solution of this distance, this distance being then measured between the processed picture element and a neighboring picture element according to the following form:

$$D1=(Rt-Rv)^2+(Gt-Gv)^2+(Bt-Bv)^2$$

This is a measurement of the distance from a processed picture element t to a neighboring picture element v. The method of the invention can be applied whatever may be the chosen distance function. In the illustrated example, we shall choose another example according to the following formula:

$$D2=Max(Rt-Rv, Gt-Gv, Bt-Bv)$$

We may now look at the way in which the watershed line is constructed for a color image. The following are given at the outset: a vector physical image comprising, for each picture element, three values, for example the luminosity of the picture element in the three channels red, green and blue, as well as a marker image presenting the class of membership in certain regions of homogeneous color of the image. The watershed line algorithm will make these regions grow by assigning them, from one to the next, the neighboring picture elements whose color least differs therefrom. This method therefore enables the demarcation, in a color image, of the regions of homogeneous color surrounding an initial marker. It is thus possible to surround various colored crystals of an rock observed by polarized light microscopy, or else cells belonging to cell sub-populations marked on a plate by a specific colored substance.

In the initialization phase:

a hierarchically organized group of queues is created. The number of the queues corresponds to the maximum distance between two colors of two picture elements;

the initiating picture elements of the method are identified in the image. In the present case (another variant of the invention) these are unmarked picture elements having, in their neighborhood, a picture element belonging to a marker, each initiating picture element is stored in a queue, this queue relating to its distance from the neighboring marked region. A picture element that neighbors two regions marked by different labels is not stored in the HOQ and immediately receives a label, in the marker image, indicating that it belongs to the boundary. With respect to the previous variant, the initiating picture elements are now direct neighboring picture elements not marked with a marker whereas, before, they were picture elements of the markers neighboring unmarked picture elements.

In the processing phase, the steps 1 and 2 are repeated so long as the hierarchical queue is not empty:

step 1: the address of the picture element having the highest priority is extracted from the queue with the highest priority during processing; let x be this point step 2: if the picture element x is a neighbor of two regions having different labels in the image, it is given a label of a boundary picture element and the step 1 is recommenced for the next picture element of the HOQ, if the picture element x is the neighbor of a single region marked as a neighbor, the picture element x is given the label of this region in the marker image (which is used as a result image) and all the neighbors are inspected.

For each neighbor y of x without a label in the marker image:

the distance from y to the marked region neighboring x is determined. This distance constitutes the priority level with which the picture element y is stored in the HOQ.

y is stored in the HOQ with its priority level.

The meaning of distance between a picture element t and a neighboring marked region R remains to be specified. It may simply be the shortest distance between the color of t and the color of the neighbor of t in the region R having the color closest to t. Computing the distance at the picture element having the shortest distance enables the construction of the regions having shades of color between the picture elements. In order to obtain, on the contrary, the smallest possible distance from the reference color of the region, it is possible for example, at anytime, to compute the mean color of all the picture elements constituting a region and to compute the distance from every new picture element to this mean color. It is also possible to define a fixed reference color for each region with respect to which the distance of every new picture element is computed. A weighted sum of these various distances can also be envisaged.

The examination of FIGS. 4a to 4l will give an illustration of this segmentation. FIGS. 4a to 4c represent the three basic components, red, green and blue, of the color of a one-dimensional physical body (having abscissa values of a to l). This is therefore really a physical vector image. FIG. 4d shows the marker image. It is also this image that will be used to represent the final result indicating the class of membership of each point of the physical body. To be able to use this image as a result image and as a marker image, two values of labels are reserved for a particular use. The label 1 means that a picture element has been placed in the HOQ and has not yet come out of it. The label 2 means that a picture element belongs to a boundary zone between two regions. The marker image furthermore has two regions determined by a marking operation. The first region, with the label 3, comprises the picture elements c and d and the second region, with the label 4, comprises the picture elements i, j and k. The distance D2 presented further above is chosen to illustrate the example.

Furthermore, to establish the distance between a picture element x and a neighboring region X, the smallest distance between the color of x and the colors of the neighbors of x belonging to the region X are chosen.

FIG. 4e shows the result of the initialization: a four-level HOQ has been created, for the maximum possible distance between two colors is equal to four. The neighbors of the markers, namely the picture elements b, e, h and l, have been stored in the HOQ with a level of priority equal to 2. Indeed, the blue component of e shows a difference of intensity equal to 2 with respect to that of the neighboring picture element d belonging to the marker. This difference of intensity is greater than the differences of intensity between the green and red components. The picture elements b and l are stored with priority 0. Indeed, their neighbors in the marker, c or k respectively, always have the same values as them for each of the blue, green or red components of the image. The picture element h is stored with priority 1. It is recalled that every picture element stored in the HOQ receives a label equal to 1 in the marker image.

The picture element b is the first to be processed. In its neighborhood, it has only a marked region with a label 3. The picture element b therefore takes this label 3 and makes the picture element a enter the HOQ with a priority of 0, for the distance of the colors of a and b is equal to 0. Simultaneously, the picture element a receives a label 1 in the marker image, meaning that it has been stored in the HOQ. This is followed by the processing, successively, of the picture elements 1 and a (FIGS. 4g and 4h) which respectively take the labels 4 and 3 but make no new picture element enter the HOQ for they each belong to the edge of the image. The queue with priority 0, which is empty, is then eliminated. The picture element h takes the label 4, that of its neighbor i which already has a label. It makes the picture element g go, with priority 0, into the queue with priority 1, for the queue with priority 0 has been eliminated (FIG. 4i). g then takes the label 4 and makes f enter the queue with priority 1 (FIG. 4j). The processing of f gives this picture element a label equal to 4, but does not make any new picture element enter the HOQ; indeed, the neighbor e of f already has a label equal to 1 indicating that it already belongs to the queue. The processing of e completes the segmentation: e neighbors two regions whose valid labels (greater than or equal to 3) are different. It therefore belongs to a boundary zone and takes the distinctive label of the boundaries, namely 2. It may be noted that in an image with more than two dimensions, a boundary picture element such as this could have neighbors that are not yet stored in the HOQ; in this case, it is decided that they will not be made to enter the HOQ.

The storage of the labels, first of all 1, when the picture element is put in the HOQ, then 3 or 4 (or even 2 for the boundary picture elements) when the picture element comes out therefrom, is not necessarily done in one and the same memory. It has already been indicated that the image of the markers and the result image could be the same. It is equally well the case that because of the temporary character of the label 1, this label could be stored with the address of the concerned picture element in an auxiliary working memory 5'. Or else it could be stored in a zone of the result memory that is different from the zone in which the label of belonging to a region must be stored.

With reference to FIGS. 5a to 5h, another exemplary implementation of the invention shall now be given. This other implementation corresponds to a wrapping (or filtering) algorithm. It shall be considered that a packet P (FIG. 5a) must be wrapped in a film F. The film is of the thermo-retractable type. We shall consider what happens in a section of this arrangement. For each abscissa point in this section, the altitudes firstly of the film and secondly of the packet to be wrapped are identified. It will be noted that the altitudes of the film are always greater than or equal to the altitudes of the packet. The packet P is shown by hatched lines. The film is shown by bold lines. FIG. 5h shows the form of the wrapping or of the filter once it has been completed. The film sticks to the packet but has fewer uneven features. This wrapping operation is very useful when it is applied to particular images. For, it may be considered that, instead of a packet P, what is being dealt with is an image whose luminosity is highly noise-ridden. To remove the noise, it may be sought to cover the "signal" of the image with a "film" that will have a smooth form at the end of the processing. In this case, the packet would be represented by the luminosity signal, the film would be represented, for example, by this luminosity signal increased, at every point, by a sufficient given magnitude (greater than the noise), or any other function majorating P. At the end of the processing, the film represents the filtered signal.

To simplify the description, it shall be assumed here that the film is retractable only in a horizontal direction so as to stick to the walls of the packet P. This simplification relates only to the function implemented in the processing. This function may be complicated in varying degrees as a function of the aim to be achieved with the image processing operation. What it is sought to show with the invention is, for a given function (hence, in this case, that of the horizontal, thermo-retractable effect), how the operations of processing the different picture elements are sequenced, independently of the nature of these processing operations.

In the present case, any picture elements whatsoever of the regional minima of the image F have been chosen as markers. It would have been possible to choose the regional minima in their totality, represented on the binary function in the lower part of FIG. 5a. By way of an automatic processing of the markers, it would have been possible to make an arbitrary choice, for being present in the HOQ, of the picture elements furthest to the left of each of the regional minima or, for a multidimensional image, the first picture element encountered of each regional minimum. Hence, the picture elements that have been determined as being markers are, starting from the left, the picture elements a, c and j (bottom of FIG. 5b).

A view shall now be given of how the method of the invention is specifically adapted to the making of the wrapping algorithm.

In the initialization phase:

a hierarchically organized group of queues is created, equal in number to the number of grey levels of the function F;

the initiating picture elements of the method are identified in the image. In the present case, these are any picture elements of any regional minima of the function F (herein they are the picture elements a, c and j), the initiating picture elements are stored in a queue, this queue relating to their value for the function F. It is noted, therefore, in reviewing the three examples presented until now, that the rank of priority for the storing of a picture element, whether it is an initiating picture element or not, in a queue of the HOQ is either related to the physical parameter of the physical image or related to the marker parameter that can be assigned to it, or finally to the result parameter.

At the end of this initializing operation, the marker image is set at zero in order to make it possible to control the progress of the processing. This control comprises the following steps:

a) as soon as a picture element comes out of the HOQ, it is assigned a definitive value for the function F. To recognize this in the rest of the processing operation, it is given a label value equal here to 2 in the marker image (picture elements marked dark grey in the drawings 5c to 5h)

b) every picture element receives a value equal to 1 in the marker image when it is stored in the HOQ (picture elements in light grey).

Thus, if a picture element has no value in the marker function at any phase whatsoever of the processing, it has never before been stored in the HOQ during this processing.

In the processing phase, the steps 1 and 2 are repeated so long as the hierarchical queue is not empty:

step 1: the picture element having the highest priority is extracted from the queue with the highest priority that is being processed, this picture element being designated as x. If this picture element does not have the value 2 in the marker image, i.e. if it has not reached its definitive result value, it is given the value 2 in the marker image and the step 2 is continued. If x reaches its definitive result value, then the operation passes to the processing of the next picture element.

step 2: for each neighbor y of x that is identified by the list of the neighborhood of x and has no value in the marker image, the following processing is carried out:

a) a variable V is considered in this particular case. The variable V has the value: V=Max (Fx or Py) in which Fx represents the value of the film function of the picture element x, Py represents the value of the packet function of the neighboring picture element y. The picture element y is stored with the priority V in the HOQ and is marked by the value 1 in the marker image.

b) the value V for the film function f is given to y as a result value.

In the example shown in FIG. 5a, the functions F and P are shown along with, in the lower part, the location of the regional minima of the function F. In choosing the terminology referred to at the beginning, it can be said that the physical parameter is the value of the function P, the marker parameter is 1, 2 or nothing, depending on whether the picture element is in the HOQ or has come out of it or has not yet entered it. The result parameter here is the definitive value of the function F. FIG. 5b, in its lower part, shows the marker picture elements that have been chosen in each regional minimum. The function F has six levels. A HOQ with six priority levels has therefore been created, the picture elements a, c, and j, y are stored with priorities corresponding to their value for the film image. At the end of the initialization, the marker function is set at zero, except, as the case may be, for the picture elements that are already in the queue and that keep the value 1 in the marker image. The processing phase then begins. The picture element c is the first to come out of the HOQ. The value of c in the marker image is not 2. It can therefore be processed and it is given the value 2 in the marker image to make its value definitive. Its definitive result value is 0. The first neighbor of c to be examined is the picture element b. The value of b in the marker image is 0. The processing step 2 can therefore be applied to it. For the picture element b, the value V is the maximum value of F at the picture element c or of P at the picture element b. It can be seen in the figure that F at the picture element c is equal to 0 and that P at the picture element b is also equal to 0. Hence, the maximum is equal to 0 and hence the result value V for b equals 0. And, consequently, b is stored in the queue with priority 0, the queue that had contained c. The picture element b is then given a value 1 in the marker image to indicate that it has been stored in the HOQ. Consequently, after the processing of c (FIG. 5c), it is possible to undertake the processing of b. Similarly, c also makes its second neighbor, the picture element d, enter the HOQ with the priority 0.

After having processed c, it is necessary to process b and d which are also assigned the value 0 as definitive values for the result function F. The processing of b causes the entry of a into the queue with priority 0. Indeed, the maximum of the function F at the picture element b or of the function P at the picture element a is 0. It is seen then that the picture element a is thus stored at two different places of the HOQ (FIG. 5d). This is due to the fact that a is also the element representing a regional minimum of the function F. However, a will take its definitive value when it first comes out of the HOQ. When it comes out the second time, it will no longer be processed. The processing of the picture element d makes the picture element e enter the HOQ with priority 4. This is shown in FIG. 5d.

The processing of the picture element a with priority 0 (FIG. 5d) makes the value of the element a definitive for the image F (it is equal to 0). To indicate that this value is definitive, this picture element a in the marker image is given the value 2. The queue with priority 0, which is empty, is now eliminated. The next picture element to be processed is also the picture element a which already has its definitive value. This is due to the fact that a has already been stored in the HOQ with a value of priority corresponding to the initialization phase. Subsequently, the value of a changes. It becomes definitive when a first comes out of the HOQ. Consequently, in a test of the step 1, it is not processed a second time and the operation passes to the following neighbor, namely the picture element j. The processing of the picture element j makes its value definitive and makes the picture elements i and k enter the queue having priority 1. This processing of the picture elements i and k firstly makes the picture element h enter the queue with priority 2 and, secondly, confers the definitive value 1 for the function F on the picture elements i and k. The wrapping then takes the form shown in the left-hand side of FIG. 5f.

Continuing in this way, the processing goes on until it gives the representation shown in FIG. 5h. The function F enveloping the function P may therefore constitute an antinoise filtering thereof.

It is noted that all the examples given start with a physical image, which is possibly a vector image, and a marker image. The initiating picture elements are selected, they are placed in a queue and the picture elements are processed by the selection of the first one that is in the queue. Then as and when the operation goes ahead, picture elements are stored in the memory. The rank of priority of the queue chosen for the storage is a function either of an image parameter (physical, marker or result) of the processed picture element or of an image parameter (ditto) of the neighbor or neighbors of the processed picture element or again of a combination of these image parameters. The processing of the image consists in computing the value of the result image at each picture element. The way in which this result image is recorded is of little importance: it may be written in a particular image or else it may gradually replace the marker image or the physical image. Examples thereof have been seen: the assigning of a membership label written in the marker in the case of the watershed line, and the gradual modification of the film image in the case of the wrapping algorithm. This processing is complex in varying degrees. In every case, there is an iteration until all the picture elements are processed. In every case, the picture elements are processed only once. Referring to FIGS. 3a to 3h, 4e to 4l and 5b to 5h, on the right-hand side, it is seen that the place occupied in the memory by the picture elements that are due to be processed is limited. It is far smaller than if all the picture elements were to be stored in advance. The stored picture elements belong indeed to the boundaries of the regions that have their definitive value. Furthermore, as and when picture elements with a given level of priority are dealt with, statistically, the neighboring picture elements have high chances of corresponding to similar priority levels. Hence, in general, the number of really active queues is small. Furthermore, since the processed picture elements are generally no longer re-recorded in the HOQ, their volume is small.

It is possible to give a definitive value when the picture element comes out of the HOQ: its neighborhood is sufficiently known to compute its definitive value. The order of processing thus implied is the right order provided that, in each queue, this processing corresponds to the order of arrival of the picture elements in the HOQ. This ensures that the plateaux of the functions are assigned to the regions correctly when the watershed line is prepared.

I claim:

1. A method for processing an image stored in a memory containing, at each picture element address, a physical value of a physical element of a body associated with each picture element and a marker value associated with each said picture element used to obtain a physical image and a marker image, said method comprising an initialization phase and a processing phase, and being aimed at the construction of a result image, wherein in the initialization phase:

a hierarchically organized group of queues HOQ, is created, the queues of this group being of the first-in-first-out type and being differentiated from one another according to an order of priority determined by their correspondence with one value among the possible values of a priority parameter, in at least one of the physical image and the marker image, picture elements for initiating the method are identified, a level of priority of each initiating picture element is assessed as a function of the physical and marker values associated with the picture element or neighboring elements of the picture element, the address of each initiating picture element is stored in a queue that corresponds to the level of its priority, in the processing phase, steps 1 and 2 are repeated so long as the HOQ is not empty:

step 1: the address of the picture element with the highest priority is extracted from the queue with the highest priority that is undergoing processing, x designating this picture element, step 2: neighbors of x are put on a neighborhood list of x, for each neighbor, y, of x that is found in said neighborhood list of x and that has never yet been stored in the HOQ during the processing phase, the level of priority of y is assessed as a function of its physical value or of physical values of picture elements of a neighborhood of y, the address of y is stored in the HOQ that corresponds to this level of priority, and x is given, in the result image memory, a label depending on its window.

2. Method according to claim 1, characterized in that an assessment is made of the value of a physical parameter that is used as a priority parameter, for a point t, at the time when said point is put into the HOQ.

3. Method according to claim 2, characterized in that, to assess the value of the physical parameter, a distance is computed between the point t and a neighboring marked region R.

4. Method according to claim 3, characterized in that, to compute the distance, a computation is made of the shortest distance between the color of t and the color of a neighbor of t in the region R having the color closest to t.

5. Method according to claim 3, characterized in that the mean color of all the picture elements constituting a region neighboring t is computed and in that, to compute the distance, the distance is computed from the color of the point t to this mean color.

6. Method according to claim 3, characterized in that a fixed reference color is defined for each region and in that, to compute the distance, the distance is computed from the color of the point t to this reference color.

7. Method according to claim 1, characterized in that the initiating picture elements are identified as those belonging to a marker region and possessing, in their neighborhood, a picture element not belonging to said marker region.

8. Method according to claim 1, characterized in that the initiating picture elements are identified as those picture elements that are outside a marker region and have a picture element of a marker region in their neighborhood.

9. Method according to claim 1, characterized in that each address of the initiating picture elements is stored in a queue relating to a unique initialization value.

10. Method according to claim 1, characterized in that when a priority queue has been emptied of the addresses of the picture elements that it contained, it is eliminated from the group of the queues, and in that the addresses of the picture elements selected subsequently to this elimination, which should have been stored in this eliminated queue, are stored in the queue with the highest-ranking priority that exists after the rank of this eliminated queue.

11. Method according to claim 1, characterized in that when a priority queue has been emptied of the addresses of the picture elements that it contained, it is eliminated from the group of the queues, and in that the addresses of the picture elements selected after this elimination, which should have been stored in this eliminated queue, are stored in a special queue with higher-ranking priority than all the other queues at a given time in the processing operation, to process these emergency situations.

12. Method according to claim 1, characterized in that, to assess the level of priority of y, a computation is made of the gradient of a physical magnitude measured in a body and assigned to a corresponding picture element for y at the place in the body at which this measurement is made.

13. Method according to claim 1, characterized in that, to assess the priority level of y, an image parameter representing an image window of this picture element is prepared according to a computation algorithm.

14. Method according to claim 1, characterized in that, to select picture elements y neighboring a picture element x:

a selection is made of all the picture elements for which at least one of the address terms is different by one unit element from the corresponding term of the address of the picture element x.

15. Method according to claim 1, characterized in that, to select the picture elements y neighboring a picture element x:

a selection is made of all the picture elements for which at least one of the address terms is different at most by two unit elements from the corresponding term of the address of the picture element x.

16. Method according to claim 1, characterized in that, to select the picture elements y neighboring a picture element x:

a selection is made of all the picture elements that belong to a list attached to the picture element x.

17. Method according to claim 1, characterized in that, when it is being stored in the HOQ, y receives, in at least one of the marker image and result image, a label identical to a label that has been assigned to x in at least one of this marker image and result image.

18. Method according to claim 1, characterized in that, when y is being extracted from the HOQ, y receives, in at least one of the marker image and result image, a label determined as follows:

if the point x is a neighbor of two regions having different labels in the image, it is given a boundary picture element label, and the step 1 is recommenced for the next picture element of the HOQ;

if the point x is the neighbor of only one neighboring marked region, the point x is given the label of this region.

19. Method according to claim 1, characterized in that, when it is being stored in the HOQ, during the processing stage, a picture element receives a label indicating that it has been stored in the HOQ and that, when it comes out of the HOQ, it receives another label indicating that this element has come out therefrom.

20. Method according to claim 1, characterized in that, for any picture element x coming out of the HOQ and not yet having a label characteristic of the picture elements having come out of the HOQ, the following processing is applied to each neighbor y of x that does not yet have a label in the marker image:

a) a variable V is considered as a function of the vector images in x and in y, b) the picture element y is stored with a priority V in the HOQ, c) and the value of V is given to y as a result value.

21. Method according to claim 20, characterized in that the variable V has, as its value: V= Max (Fx or Py) in which Px represents a value of a film function at the point x, Py representing a physical value at the neighboring point y.1.

* * * * *